May 20, 1952 — A. R. LINDSAY — 2,597,837
OPEN AUTOMOBILE BODY
Filed June 3, 1949 — 2 SHEETS—SHEET 1

INVENTOR.
Alexander R. Lindsay
BY Maurice A. Crews
ATTORNEY

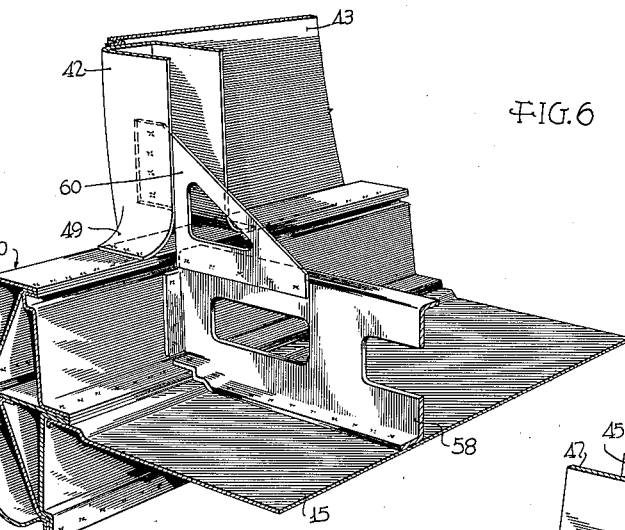
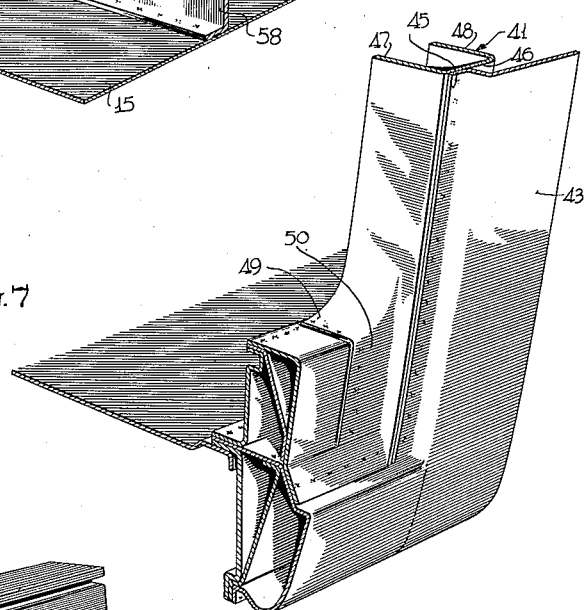
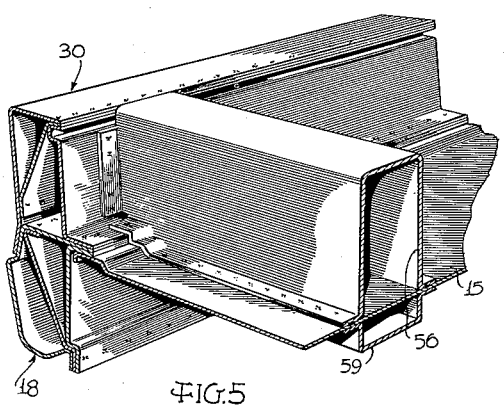

UNITED STATES PATENT OFFICE 2,597,837

OPEN AUTOMOBILE BODY

Alexander R. Lindsay, Detroit, Mich., assignor to The Budd Company, Philadelphia, Pa., a corporation of Pennsylvania Application June 3, 1949, Serial No. 96,911

5 Claims. (Cl. 296—28)

The invention relates to the construction of automobile bodies and, more specifically, to bodies of the self-sustaining type which are designed for private passenger use and which have no stress transmitting chord structure in the form of a permanent roof or roof rails across door openings in the side walls. In other words, the invention relates to so-called pleasure or private, open-type bodies, such as roadsters and convertibles.

In most present-day automobiles, whether the body is self-supporting or supported by a separate chassis frame, the body contributes all or at least a large part of the supporting strength. Bodies of the closed type present a large hollow-section beam in which the roof and the roof headers constitute an upper chord structure which directs stresses across the tops of door and window openings. The open-type bodies have, however, to rely for their strength in the regions of the door openings entirely on the strength of the chassis frame body, underframe threshold or floor structure, and it is a problem to supply this strength, especially in open-type, self-supporting bodies which have no separate chassis frame.

It is an object of the invention to incorporate the required strength into open-type, particularly self-supporting bodies, without undue increase of weight and expense, and by employing reinforcing parts which are of simple configuration, can be easily manufactured and conveniently assembled with the remainder of the body.

Another object of the invention is an open-type body construction which permits the use, to a large extent, of body parts designed for closed-type bodies, and which combines the required strength with a pleasant appearance and with comfortable accommodation of the occupants.

The above and other objects and advantages are achieved by a side sill structure projecting in part downwardly beyond and in part upwardly beyond the floor panel, extending longitudinally across and beyond a door opening, and being connected to the door posts.

More specifically, the invention contemplates the arrangement of a hollow-section threshold member on top of the customary side sill, interior reinforcing webs in the reinforcement and the side sill, the connection of the upwardly projecting sill parts and door posts with transverse members or floor beams, and the inward offsetting of the upwardly projecting sill parts relative to the adjoining portions of the outer body surface and the coverage of such sill parts on the outside by a thin, outer, apron-like, downward extension of the door. The invention is, however, not confined to these briefly and somewhat sketchily outlined features but embraces other features, especially details.

The objects, advantages and features of the invention are fully disclosed and explained in connection with the embodiments illustrated in the attached drawing and described hereinafter.

In the drawing:

Figures 5 and 6 are fragmentary, sectional, three-quarter front perspective inside views of about the body regions surrounded by the correspondingly numbered dot-and-dash circles in Figure 2;

Figure 7 is a fragmentary, sectional, three-quarter rear perspective outside view of the region surrounded by dot-and-dash line 7 in Figure 2.

Figure 1:
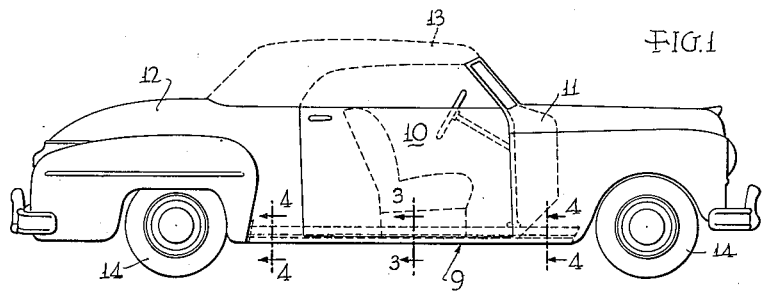
Figure 1 is a diagrammatic side elevation of a roadster.
Figure 2:
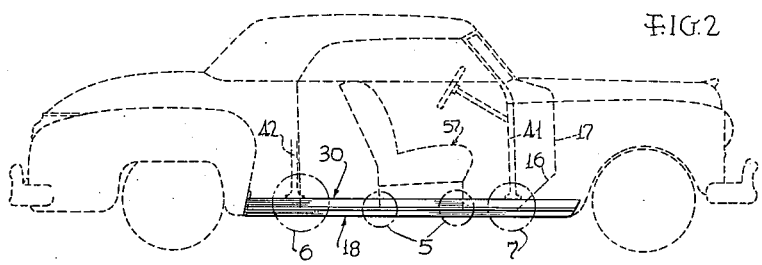
Figure 2 is a view similar to Figure 1 but showing the new threshold and sill construction in full lines and the remainder of the roadster in dotted lines.

The roadster illustrated in the drawing has an underframe or floor structure 9, a side door 10, at least one in each side of the body, a cowl and motor compartment forward section 11, a tonneau or rear section 12 and a collapsible roof 13. The construction of the underframe at the front and at the rear, of the front portion 11, of the rear portion 12, and the support of the body on the wheels 14, may be of any known or otherwise appropriate constructional design, for instance, of the general design illustrated in applicant's copending applications "Rear End Construction Of Self-Supporting Automobile Bodies," Serial No. 29,457, and "Self-Supporting Bodies For Automobiles," Serial No. 29,458, both filed May 27, 1948.

Similar to the body construction disclosed in applicant's aforesaid applications, the underframe 9 comprises a sheet metal floor panel 15 extending over the entire width of the body and merging at the front into toe board 16 and dash board or shroud panel 17. Secured to each side margin of the floor panel 15 between the wheels 14 is a side sill structure 18 comprising a generally angle-section member 19 and an outer inwardly facing channel-section member 20 of sheet metal.

In the new construction, however, the interior of the closed box section formed by the members 19 and 20 is reinforced interiorly by a diagonally arranged reinforcement in the form of a sheet metal web or band 21 secured by a flange 22 to the top wall 23 of member 20 and by a downwardly extending flange 24 between a downwardly projecting flange 25 of member 20 and the lower inwardly offset margin 26 of member 19.

In the construction illustrated in Figures 1 to 7, member 20 has along its upper edge a downwardly and outwardly inclined portion 27, which is supplemented in the threshold or door region by an inward offset or step 28 between the inclined portion 27 and the outer wall 29 of member 20. The sills 19 extend from the front and rear wheel housings and are stress transmittingly tied into the forwardly and rearwardly adjoining portions of the body, for instance in the manner disclosed in the inventor's above named applications.

So as to obtain in an open-type body the necessary strength between the front and rear body portions 11 and 12, which in a closed body is partly supplied by the roof structure, a threshold or second sill structure 30 is placed on top of and secured to sill structure 18.

Structure 30 has an inner angle-section wall 31 overlappingly connected, as by spot welding, by its inwardly directed lower flange 32 with the inner margin of wall 23, the upper arm 19' of sill section 19 and the side margin of floor panel 15. The upper margin of member 30 is formed with a narrow inwardly facing channel having a top wall 33. An angle section outer member 34 of the additional sill structure 30 has the lower outwardly and downwardly inclined flange 35 along its outer arm or wall 36 secured, as by spot welding, to the inclined edge portion 27 of sill member 20. The upper sill structure 30 is reinforced interiorly by a diagonally arranged web or band 37, similar to web 21, which by flange 38 along its upper margin is sandwiched between and secured, such as by spot welding, to wall or flange 33 of member 31 and the inner margin of the upper wall or arm 39 of angle section member 34. A downwardly directed flange 40 along the lower margin of web 37 is secured to the outer wall 36 of member 34 just above wall 23 of the lower sill member 29.

The reinforcing sill structure 30 extends at least through the threshold region of the opening closed by door 10 and preferably therebeyond. This structure may, as shown in the drawing, be coextensive with the ordinary sill structure 19 and may be tied into the adjoining body structures at the front and rear. The same applies in regard to the longitudinal extent of the diagonal reinforcing webs 21, 37, one or both of which may be coextensive with their respective sill structure 18, 19 or may be confined to a shorter region, such as the threshold region proper.

The construction of the lower ends of the front door post 41 and of the rear door post 42 as well as their connection with the side sill structures, and the connection of the outer panels 43 in front and in rear of the door opening, are shown as being substantially alike so that the corresponding parts are designated by the same reference numerals and described together.

Figures 3, 4, 8:
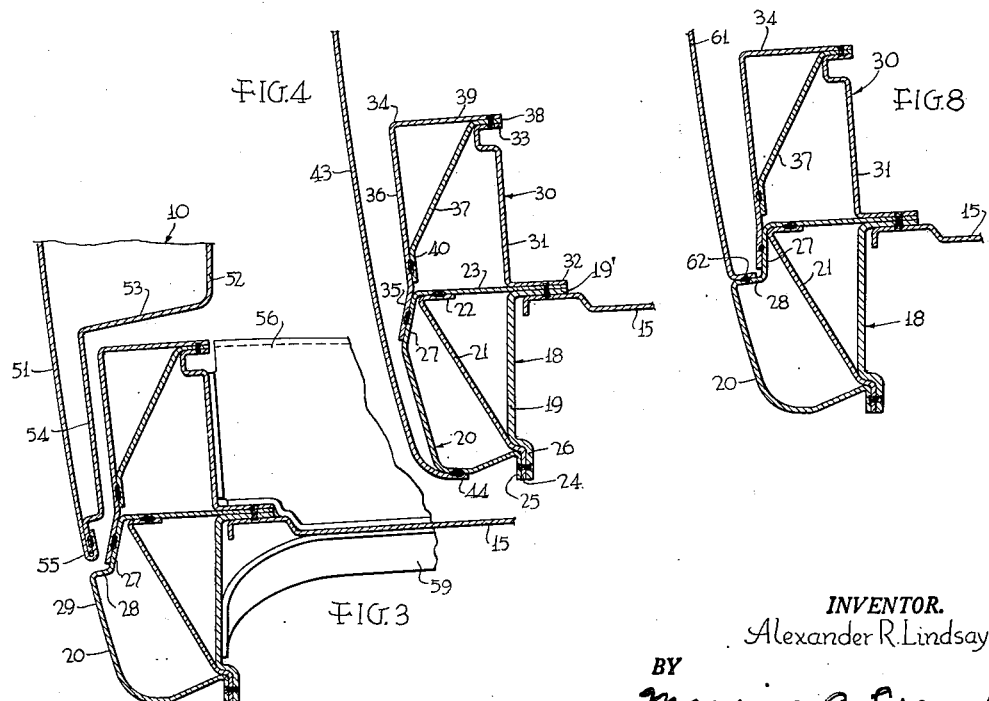
Figures 3 and 4 are local sections, on a larger scale, along the correspondingly numbered lines of Figure 1.
Figure 8 is a section corresponding to Figure 4 but illustrating a modified construction.

Each panel 43 is, as shown in Figure 4, secured, such as spot welded, with its inwardly directed lower marginal flange 44 to the underside of the sill member 20. The outer wall 29 of sill member 20 may in the region of the panels 43 be inwardly offset so that the portion of outer wall 29 in the intervening threshold region merges without offset and visible joint into the adjoining lower portions of the panels 43, Figures 3, 4 and 7. An inwardly offset flange 45 along the front or rear margin of the respective panel 43 is secured, as by spot welding, to the outer post wall 46, Figures 6 and 7.

The posts 41, 42 may be of inwardly facing channel section and may have a wall 47 forming the jamb face of the door opening. The wall 47 and the opposite post wall 48 have their lower ends laterally flared at 49 and a flange 50 which is inwardly offset with respect to the outer wall 46. The flanges 49 and 50 nest over and are secured, as by spot welding, to top wall 39 and outer wall 36 of the upper sill member 34. Walls 30 and 36 may be joggled (not shown) so that their portions between the posts merge into the post flanges 49 and 50.

The door 10 has an outer panel 51 of customary configuration so as to fit into the door opening and so that its outer surface merges without offset into the adjoining surfaces of the panels 43 and the outer wall 29 of sill 18. The inner panel or frame structure 52 of the door has in its lower region a shape which differs from customary constructions in that it is outwardly recessed at 53, 54 so as to receive in the recess the upwardly projecting supplemental sill or threshold structure 30. The lower part of outer panel 51 and portion 54 of the inner door structure form an apron-like thin downward extension of the main body of the door which is about as thick as the sill 18 and the adjoining side walls formed by the posts 41 and panels 43.

Along its lower margin, as shown in Figure 3, and also along its side margins, the door is provided on the outside with the customary overlap flange 55 received in the offset or recess formed at the bottom by the wall portions 27, 28 of the sill and at the sides by the inwardly offset flanges 45 of the panels 43.

The inward offsetting of the upper sill or threshold structure 30 relative to the lower sill structure 18 and the front and rear panels 43 in combination with a door having a recess along its inner margin or a downwardly projecting apron on the outside, has the advantage of hiding the sill extension from view when the door is closed, so that the threshold portion and its connections do not require the high finish and the expensive material necessary for surfaces exposed to view. This construction has the further advantage of giving the car a good appearance as compared with an appearance in which the door would end at about the upper margin of the added threshold member 30.

In most cases, the body is substantially symmetrically constructed relative to its longitudinal middle line and has on each side a side wall with at least one door opening, side sill structures 18, 30 and posts 41, as shown and described for the one side. Should there be no door opening in one side, the supplemental sill 30 may for that side be dispensable.

The side sill structures on both sides of the body are interconnected by the floor panel 15 and by a number of cross members. The upwardly projecting threshold structures 30 are interconnected by a pair of cross members 56 arranged longitudinally spaced from each other under the front seat 57, Figures 2, 3 and 5, and by a cross member 58 arranged between the rear posts 42, Figures 2 and 6.

The cross members 56, of which only one is shown in Figure 5, may be formed by a downwardly facing hat section secured at its ends to the threshold structures 30 and along its lower margins to the top of floor panel 15 and to one registering under-floor cross member 59 of upwardly facing hat section.

The rearward cross member 58 may be of angle, Z- or U-section having its ends and its lower margin, respectively, secured to the threshold members 30 and to the floor panel 15. The cross member 58 is, furthermore, secured to each rear door post 42 by a bracket 60.

The cross members and other connections to the sill structures 30 and the posts 42 firmly brace the body side walls against each other. Such bracing is particularly important in open-type bodies which lack the upper transverse connection afforded in closed bodies by the roof.

In Figure 8, showing a slightly modified construction, the same numerals are employed for corresponding parts as in the preceding figures, and merely the differences will be pointed out. While in the preceding figures, cowl side and rear panel 43 extend in their regions over the outside of the sill structure 18, the corresponding panel 61 of Figure 8 rests by an inwardly directed flange 62 on the ledge or offset 28 which, in this case, is extended beyond the door opening.

The invention is not restricted to the illustrated embodiment and its one modification, but it is susceptible to other modifications and to adaptations to different forms and designs of open-type automobile bodies. For instance, instead of building up the side sill structure of two superimposed sections 18 and 30, which has the specific advantages mentioned hereinbefore, a unitary sill structure may be found acceptable, which extends partly below and partly above the floor panel and affords the strength required for an open-type body. More generally, the invention is not necessarily restricted to the details of the shape and extent of the sections entering into the side sill structure nor to the specific arrangements and shapes of the posts and cross members and their connection with the reinforcing threshold structures.

What is claimed is:

1. A self-supporting automobile body designed for direct support by the running gear, of the type having side walls with door posts along door openings, being free of an upper chord structure—such as a roof—interconnecting the upper ends of the door posts, and having a floor panel structurally connected to the side walls and to side sills and cross members, said side sills projecting downwardly from said floor panel and designed for a body having above door openings in the side wall an upper chord structure such as in the form of a permanent rigid roof; said sills being provided, for use in open-type bodies free of such upper chord structure, on each side with an auxiliary hollow-section sill structure secured on top of said first-named sill structure and projecting a substantial distance upwardly beyond said floor panel, said auxiliary sill structures extending across the door openings and therebeyond being structurally connected with the lower ends of the door posts.

2. In an automobile body, a side wall provided with posts along a door opening, a floor panel and a side sill structure, said sill structure comprising two separately manufactured and structurally interconnected parts, one part extending downwardly below and another part projecting upwardly above the floor panel and being structurally connected with the panel, with said side wall and with transverse reinforcing members, said panel, sill structure and transverse members performing functions of body underframe and chassis frame, said downwardly extending part of the sill structure being designed for a body having above door openings in the side walls an upper chord structure such as in the form of a permanent rigid roof, the part of said sill structure extending upwardly above the top surface of said floor panel providing the strength to the sill structure necessary for its use in open-type bodies free of such upper chord structure and having its outer surface inwardly recessed relative to the outer surface of the sill part extending downwardly beyond the floor panel and relative to the outer surfaces of posts and side wall, and a door in said opening, said door having a hollow main body of a thickness about equalling the thickness of said side wall and fitting between the posts and upwardly projecting sill part, said door having furthermore on its outside a downwardly projecting apron-like hollow extension of said main body but of less thickness than the latter, said extension, with the door in closed position, covering the outside of the upwardly projecting sill part.

3. In a self-supporting automobile body of the open type, having as main load supporting and stress transmitting element an underframe structure including a sheet metal floor panel reinforced by integral connection with side sill structures and transverse members, door posts and side panels extending upwardly beyond said sill structures and secured to them in front and in rear of side wall door openings, said integrally connected side sill structures projecting in large part downwardly below and in large part upwardly above said floor panel, said side sill structures performing the functions of body underframe as well as of chassis sills, certain of said transverse members being arranged below and others on top of said floor panel, at least one of said transverse members arranged on top of the floor panel having its ends secured to the upwardly extending parts of the side sill structures and to transversely opposite door posts.

4. In an automobile body which performs at least to a large extent load sustaining and stress transmitting functions in the region between the front and the rear wheels, a sheet metal floor panel reinforced by sheet metal cross members and hollow-section side sill structures, the latter extending downwardly beyond said floor panel and designed for a body having above door openings in the side walls an upper chord structure such as in the form of a permanent rigid roof, said sill structures being modified for use in open-type bodies free of such upper chord structure by the addition of a second sill structure superimposed on and structurally secured to said first sill structure, said second sill structure projecting upwardly beyond the top surface of said floor panel and extending at least over the entire region between front and rear wheel housings.

5. In an automobile body which performs at least to a large extent load sustaining and stress transmitting functions in the region between the front and the rear wheels, a sheet metal floor panel reinforced by sheet metal cross members and on each side by a hollow-section side sill structure, the latter extending downwardly beyond said floor panel and designed for a body having above door openings in the side walls an upper chord structure such as in the form of a permanent rigid roof, said sill structures being strengthened for use in open-type bodies free of such upper chord structure by second, supplemental, hollow-section sill structures superimposed on and structurally secured to them and by webs diagonally arranged and secured in the interior of both the first-named and the second sill structures.

ALEXANDER R. LINDSAY.

REFERENCES CITED

The following references are of record in the file of this patent:

UNITED STATES PATENTS

| Number | Name | Date |
|---|---|---|
| 1,558,435 | Breneman | Oct. 20, 1925 |
| 1,827,743 | Groehn | Oct. 20, 1931 |
| 2,102,402 | Zeder | Dec. 14, 1937 |
| 2,105,713 | Werdehoff | Jan. 18, 1938 |
| 2,115,913 | Hicks | May 3, 1938 |
| 2,209,285 | Schjolin | July 23, 1940 |
| 2,240,022 | Saives | Apr. 29, 1941 |
| 2,324,677 | Cadwallader | July 20, 1943 |
| 2,488,978 | Julien et al. | Nov. 22, 1949 |